United States Patent Office 3,043,837
Patented July 10, 1962

3,043,837
3,11 - DIOXYGENATED 17α - CARBOXYETHYLAN-DROST-4-EN - 17β - OL LACTONE, NOR COMPOUNDS CORRESPONDING, AND MANUFACTURING PROCESSES
John A. Cella, Skokie, Ill., assignor to G. D. Searle & Co., Chicago, Ill., a corporation of Delaware
No Drawing. Filed Aug. 17, 1959, Ser. No. 833,956
11 Claims. (Cl. 260—239.57)

This invention relates to 3,11-dioxygenated 17-carboxyalkylated androsten-17-ols, nor compounds corresponding, and processes for the manufacture thereof. More particularly, this invention relates to compounds of the formula

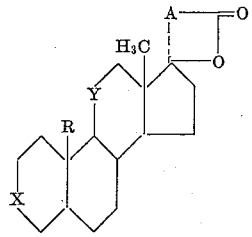

wherein R represents hydrogen or a methyl radical; A represents an alkylene or alkenylene radical, especially ethylene or vinylene; X and Y each represent a hydroxymethylene or carbonyl radical; and the carbon atom in position 5 is doubly bonded to any one of the carbons at 4, 6, and 10.

Equivalent to the foregoing lactones for purposes of the present invention are the corresponding hydroxy acids and their alkali salts, of the formula

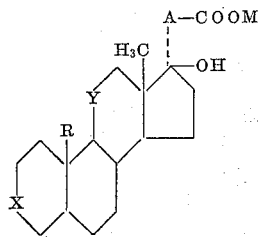

wherein R, A, X, and Y have the meanings assigned before, there being a 4(5), 5(6), or 5(10) double bond present in each instance; and M represents hydrogen, an alkali metal, or the ammonium radical. Those skilled in the art will appreciate that the described salts are readily derived from the corresponding lactones on contact with aqueous alkali. The free acids, in turn, are obtained from the salts by a critically brief exposure to a proton source; prolongation of the exposure time induces lactonization.

The application for Letters Patent securing the invention herein described and claimed is a continuation-in-part of applicant's prior copending application, Serial No. 682,626, filed September 9, 1957, and now abandoned.

The compounds of this invention are useful because of their valuable pharmacological properties. Thus, for example, the subject compositions are diuretic agents wherein 11-oxygenation serves to surprisingly enhance the ratio of oral to parenteral activity.

Manufacture of the compounds herein disclosed and claimed proceeds from 11-methylenic lactones of the formula

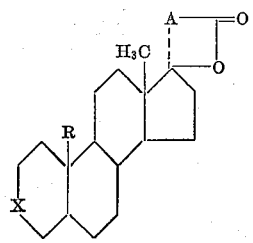

[X, R, and A being defined as above and there being a 4(5), 5(6), or 5(10) double bond present] described by John A. Cella in United States Patent No. 2,705,712 and his application for United States Patent No. 741,473, filed June 12, 1958. These lactones, although apparently impervious to 11-oxygenation by such well-known hydroxylaters as Aspergillus and Penicillium, upon fermentation with a culture of Rhizopus are converted to the corresponding 11α-compounds hereof, and on perfusion through excised, surviving, desirably lacerated, mammalian adrenal glands afford the apposite 11β-compounds. The 11-hydroxy compounds, in turn, are further oxidized to corresponding 11-ketones on contact with chromic anhydride in aqueous acid acetonic medium.

The fermentation procedure is carried out in a suitably nutritive medium preliminarily inoculated with spores of Rhizopus fungus and maintained at about 25° with agitation under aerobic conditions conductive to the development of submerged growth. The steroid to be oxygenated is preferably added to the flourishing culture in solution—for example, in acetone or propylene glycol—whereupon the fermentation is continued as before until such time as the oxidation is substantially complete—representatively, after upwards of 24 hours. The fermentation medium is then extracted with an appropriate solvent, such as dichloromethane, and the desired product obtained as the residue following vacuum distillation.

In the perfusion process, glands from such as cattle, horses, pigs, rabbits, and other common animals are used, those from larger animals being more convenient, and cow adrenals being especially preferred. The glands are carefully dissected from the anesthetized or freshly killed animal following laparotomy and quickly transferred to cold aqueous saline for prompt perfusion. Extraneous fat and tissue are removed from each gland, and small venal entries near the main large vena cava are tied off. A suture is looped around the neck of the adrenal vein, and a cannula is pressed in and tied. Preferably, multiple cortical laceration over substantially the entire surface of the gland is effected, the lacerations being spaced from 0.5 to 3 millimeters apart through a depth of ¼ to ½ the thickness of the cortical layer, and care being exercised to avoid mutilating the deeper medular layer of the gland. Aqueous saline is applied to the cannula under a pressure of 20–50 millimeters of mercury to free the system from air, flush it, and insure an adequate flow rate. During this operation, all fat unembianous tissue and the major residue of the wall of the vena cava are trimmed off. The resultant preparation is preserved in cold aqueous saline pending affixment to the perfusion pump.

Citrated whole blood is the perfusion medium of widest application, although other commonly operative media include blood serum, blood plasma with saline, technical blood albumin, synthetic plasma substitutes, and mixtures of such materials. Citration, typically, is achieved by mixing 85 volumes of whole cow blood with 15 volumes of a solution of 1.6% sodium citrate and 5% glucose in water. A combination of 7 parts of citrated blood with 5 parts of "modified" (calcium chloride omitted) Tyrode solution affords a particularly efficacious perfusion medium. The tendency of blood-containing media to clot can be minimized by preliminary perfusion through liver.

Perfusions are ordinarily carried out at temperatures in the range, 35–40° centigrade, the perfusion media being supplied at pressures of the order of 20–100 millimeters of mercury by means of circulating pumps. One or a plurality of (parallel) glands is employed, and the time of perfusion varies from a few minutes to several hours, depending upon the rate of flow and the volume of material to be perfused. A flow rate of 3 to 6 liters per gland per hour is generally satisfactory both as to conversion of starting material and purity of product. At least one pass through the glands(s) is, of course, indicated; and additional cycles may increase the yield of oxygenated product where input concentrations of material to be hydroxylated are comparatively high. The preferred concentration of starting material is 50–300 milligrams per liter, but as little as 50 and as much as 1000 milligrams per liter may be perfused on occasion. Incorporation of the starting material is facilitated by first dissolving it in a small amount of solvent, for example, propylene glycol.

It is essential that perfusion be commenced as rapidly as possible after preparation of the gland is completed, and the entire procedure is best performed as aseptically as conditions will permit. Practical sterility can be maintained by addition to the medium of suitable concentrations of antibiotics such as penicillin and streptomycin. Throughout the course of the perfusion, oxygen is continuously fed into the perfusion liquid to insure maximum survival of the gland(s).

The 11β-hydroxylated lactones present in the perfusate can be isolated by a variety of procedures known in the art, perhaps the simplest of which involves merely extracting with a solvent—for example, isopropyl acetate—which is then stripped by evaporation under reduced pressure, leaving the desired product as a residue which can be further purified by recrystallization from benzene or the equivalent. As an alternative to perfusing the corresponding 11-methylenic material in deriving the 3-hydroxy-5-enic lactones of this invention, the latter materials can be prepared from corresponding 3-oxo-4-enes wherein the 11-oxygen function has been introduced, by 3-enolization with isopropenyl acetate followed by sodium borohydride reduction in alcohol.

The following examples describe in detail compounds illustrative of the present invention and methods which have been devised for their manufacture. However, the invention is not be be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade, pressures in pounds per square inch (p.s.i.) or millimeters (mm.) of mercury, and relative amounts of materials in parts by weight, except as otherwise noted.

Example 1

*17α - (2 - carboxyethyl) - 11α,17β - dihydroxyandrost-4-en-3-one γ-lactone hemimethanolate.*—A stainless steel fermentation tank is charged with a nutrient medium containing, per 1000 parts of tap water, 33 parts of dextrose, 5 parts of commercial cotton seed meal flour, 3 parts of corn steep liquor, and 2 parts of silicone antifoam emulsion. Tank and medium are sterilized by heating to temperatures in the range, 110–120°, and then cooled to about 25°, whereupon the medium is inoculated with an aqueous suspension of spores from a culture of Rhizopus sp. A.T.C.C. 13429. The medium is maintained at about 25° for 29 hours, during which time a stream of sterile air is passed through and the developing culture is agitated to produce submerged growth. Sufficient 17α - (2 -carboxyethyl) - 17β - hydroxyandrost-4-en-3-one lactone dissolved in a minimal quantity of acetone is then introduced to bring the concentration of steroid to one part per 3000 parts of medium. Agitation with aeration at about 25° is thereupon resumed for 12 hours, at the end of which time the resultant mixture is extracted with dichloromethane. The extract is dried over anhydrous sodium sulfate and stripped of solvent by distillation. The residual oil, on trituration with anhydrous ether, crystallizes. Recrystallization from methanol affords the desired 17α-(2-carboxyethyl)-11α,17β-dihydroxyandrost - 4 - en - 3 - one lactone hemimethanolate melting at 173–174°. The product is further characterized by a maximum in the ultraviolet spectrum at 241 millimicrons with a molar extinction coefficient of 15,900. The specific rotation of a dioxane solution, referred to sodium D, is +48°. The product has the formula

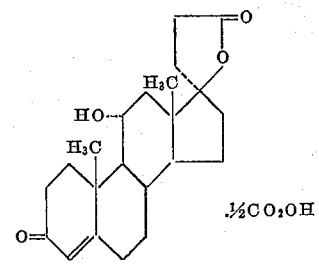

Example 2

*17α - (2 - carboxyethyl) -11β,17β-dihydroxyandrost-4-en-3-one γ-lactone.*—A solution of one part of 17α-(2-carboxyethyl)-17β-hydroxyandrost-4-en-3-one lactone in 40 parts of propylene glycol is added to 250 volumes of a perfusion medium made by mixing 7 parts of citrated whole cow blood with 5 parts of "modified" (calcium chloride omitted) Tyrode solution and subjecting the resultant mixture of the action of a stream of oxygen bubbling therethrough over 2½ hours period. Perfusion at 36–37.5° C. through 8 cow adrenals averaging 17.9 grams each is straightway commenced, the glands in question having been preliminarily trimmed, cannulated, and otherwise prepared in accordance with the technique hereinbefore described. During the course of the perfusion, oxygen is continuously bubbled through the medium. After approximately 3 hours, in the course of which 6 passes of the medium through the glands are completed, perfusion is stopped; and the perfusate is thrice extracted with isopropyl acetate. Solvent is removed from the combined extracts by evaporation under reduced pressure, and the residue is crystallized from ethyl acetate. The product thus obtained is 17α-(2-carboxyethyl)-11β, 17β-dihydroxyandrost-4-en-3-one lactone, which melts at 203–207° C. and has the formula

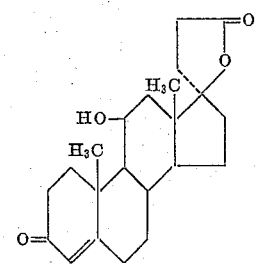

Example 3

*17α - (2-carboxyethyl)-17β-hydroxyandrost-4-ene-3,11-dione lactone.*—To a solution of 6 parts of 17α-(2-carboxyethyl) - 11β,17β-dhydroxyandrost-4-en-3-one lactone in 400 parts of acetone at room temperatures is added, with vigorous agitation, a mixture of 2 parts of chromic anhydride, 3 parts of concentrated sulfuric acid, and 5 parts of water. Excess oxidant is destroyed with 2-propanol, whereupon the resultant mixture is filtered and the filtrate evaporated to dryness in vacuo. The residue, recrystallized from anhydrous ethanol, is 17α-(2-carboxyethyl)-17β-hydroxyandrost-4-ene-3,11-dione lactone melting at 255–258° C. The product has the formula

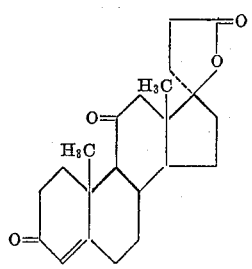

Example 4

*17α - (2 - carboxyethyl) - 11α,17β-dihydroxy-19-norandrost-4-en-3-one γ-lactone.*—A stainless steel fermentation tank is charged with a nutrient medium containing, per 1000 parts of tap water, 27 parts of dextrose, 5 parts of commercial cotton seed meal flour, 3 parts of corn steep liquor, and 2 parts of silicone anti-foam emulsion. Tank and medium are sterilized by heating to temperatures of the order of 110–120° and then cooled to about 25°, whereupon the medium is inoculated with an aqueous suspension of spores from a culture of Rhizopus sp. A.T.C.C. 13429. The medium is maintained at about 25° for 48 hours, during which time a stream of sterile air is passed through and the developing culture is agitated to produce submerged growth. Sufficient 17α-(2-carboxyethyl)-17β-hydroxy-19-norandrost-4-en-3-one lactone dissolved in a minimal quantity of acetone is then introduced to bring the concentration of steroid to 1 part per 3000 parts of medium. Agitation with aeration at about 25° is thereupon resumed for 16 hours, at the end of which time the resultant mixture is extracted with dichloromethane. The extract is dried over anhydrous sodium sulfate and stripped of solvent by distillation. The residual oil, on trituration with anhydrous ether, crystallizes. Recrystallization from ethyl acetate affords the desired 17α-(2-carboxyethyl)-11α,17β-dihydroxy-19-norandrost-4-en-3-one γ-lactone melting at 140–142°. The product is further characterized by a maximum in the ultaviolet spectrum at 240.5 millimicrons, with a molar extinction coefficient at 17,000. The product has the formula

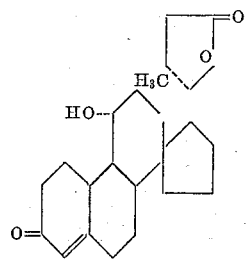

Example 5

*17α - (2 - carboxyethyl) - 11β,17β-dihydroxy-19-norandrost-4-en-3-one γ-lactone.*—Using the technique of Example 1, 1 part of 17α-(2-carboxyethyl)-17β-hydroxy-19-norandrost-4-en-3-one lactone is perfused through 8 cow adrendals averaging 17.8 grams each to give, after 3 hours during which 11 passes occur, 17α-(2-carboxyethyl)-11β,17β-dihydroxy-19-norandrost-4-en-3-one lactone, which is purified by consecutive recrystallization from benzene and anhydrous ethanol. The product thus obtained melts at 213–215° C., solidifies above this melting point and melts again at 220–222° C., and has the formula

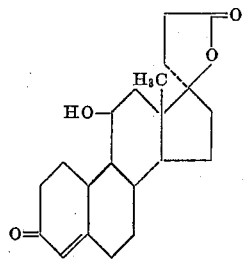

Example 6

*17α - (2 - carboxyethyl)-17β-hydroxy-19-norandrost-4-ene-3,11-dione lactone.*—Using the technique of Example 2, 8 parts of 17α-(2-carboxyethyl)-11β,17β-dihydroxy-19-norandrost-4-en-3-one lactone in 500 parts of acetone is oxidized with a mixture of 2 parts of chromic anhydride, 3 parts of concentrated sulfuric acid, and 5 parts of water. The 17α-(2-carboxyethyl)-17β-hydroxy-19-norandrost-4-ene-3,11-dione lactone which results is purified by recrystallization from methanol. The material thus obtained melts at 234–237° C. and has the formula

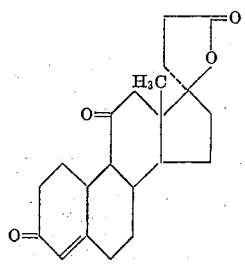

What is claimed is:
1. A compound of the formula

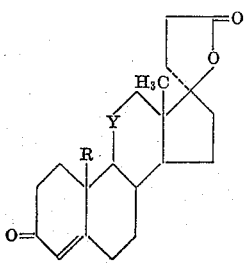

wherein R is selected from the group consisting of hydrogen and methyl radicals and Y is selected from the group consisting of hydroxymethylene and carbonyl radicals.

2. 17α - (2-carboxyethyl)-11α,17β-dihydroxyandrost-4-en-3-one γ-lactone hemimethanolate.

3. 17α - (2-carboxyethyl)-11β,17β-dihydroxyandrost-4-en-3-one γ-lactone.

4. 17α - (2-carboxyethyl)-17β-hydroxyandrost-4-ene-3,11-dione lactone.

5. 17α - (2-carboxyethyl)-11α,17β-dihydroxy-19-norandrost-4-en-3-one γ-lactone.

6. 17α - (2-carboxyethyl)-11β,17β-dihydroxy-19-norandrost-4-en-3-one γ-lactone.

7. 17α-(2-carboxyethyl)-17β-hydroxy-19-norandrost-4-ene-3,11-dione γ-lactone.

8. In a process for the manufacture of compounds of the formula

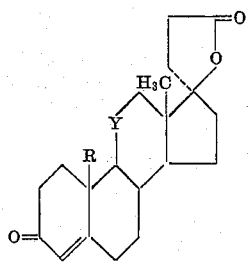

wherein R is selected from the group consisting of hydrogen and methyl radicals and Y is selected from the group consisting of α-hydroxymethylene and carbonyl radicals, the step which comprises contacting with enzymes from a culture of Rhizopus A.T.C.C. 13429 and 11-methylenic steroidal lactone of the formula

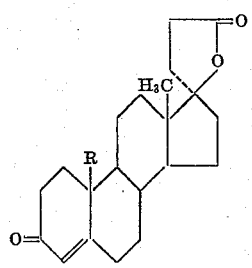

R being defined as before.

9. In a process for the manufacture of compounds of the formula

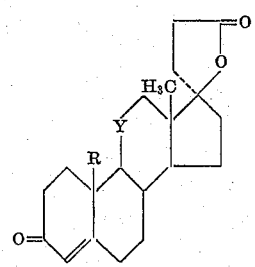

wherein R is selected from the group consisting of hydrogen and methyl radicals and Y is selected from the group consisting of α-hydroxymethylene and carbonyl radicals, the step which comprises aerobically contacting with a submerged culture of Rhizopus A.T.C.C. 13429 an 11-methylenic steroidal lactone of the formula

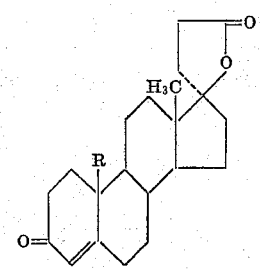

at 25° in a nutrient medium, R in the formula for the 11-methylenic lactone being defined as before.

10. In a process for the manufacture of compounds of the formula

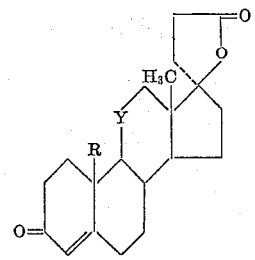

wherein R is selected from the group consisting of hydrogen and methyl radicals and Y is selected from the group consisting of β-hydroxymethylene and carbonyl radicals, the step which comprises perfusing an excised, surviving, beef adrenal gland with an 11-methylenic steroidal lactone of the formula

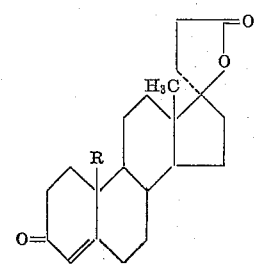

R being defined as before.

11. In a process for the manufacture of compounds of the formula

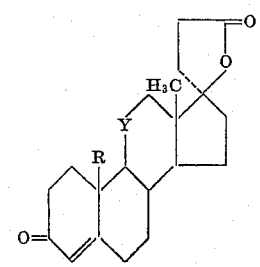

wherein R is selected from the group consisting of hydrogen and methyl radicals and Y is selected from the group consisting of β-hydroxymethylene and carbonyl radicals, the step which comprises perfusing an excised, surviving, cortically-lacerated, beef adrenal gland with an 11-methylenic steroidal lactone of the formula

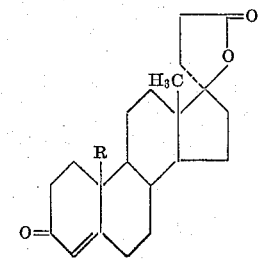

at 36–37.5° in a medium derived and maintained by bubbling oxygen through a mixture of citrated beef blood and Tyrode solution modified to the extent that calcium chloride is not present, R in the formula for the 11-methylenic lactone being defined as before.

References Cited in the file of this patent

UNITED STATES PATENTS

| | | |
|---|---|---|
| 2,658,022 | Haines et al. | Nov. 3, 1953 |
| 2,705,712 | Cella | Apr. 5, 1955 |
| 2,844,513 | Wettstein et al. | July 18, 1956 |
| 2,918,463 | Cella | Dec. 22, 1959 |

UNITED STATES PATENT OFFICE
CERTIFICATE OF CORRECTION

Patent No. 3,043,837                            July 10, 1962

John A. Cella

It is hereby certified that error appears in the above numbered patent requiring correction and that the said Letters Patent should read as corrected below.

Column 2, line 30, for "conductive" read -- conducive --; column 3, line 49, for "lacetones" read -- lactones --; column 4, lines 25 to 38, to the right of the formula, for ".½CO$_2$OH" read -- .½CH$_3$OH --; column 5, lines 60 to 71, the formula should appear as shown below instead of as in the patent:

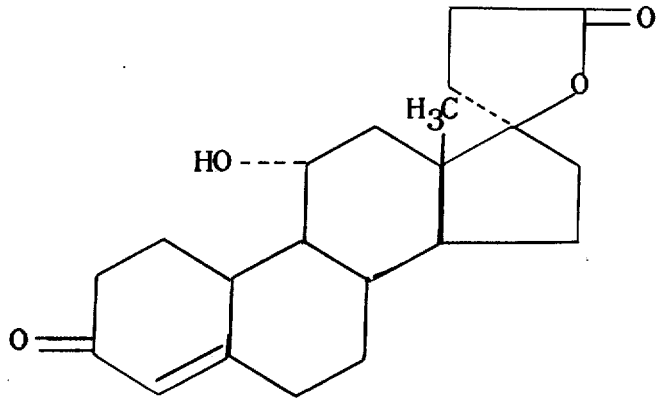

Signed and sealed this 30th day of July 1963.

(SEAL)
Attest:

ERNEST W. SWIDER                           DAVID L. LADD

Attesting Officer                               Commissioner of Patents